(12) United States Patent
Du et al.

(10) Patent No.: US 10,360,913 B2
(45) Date of Patent: Jul. 23, 2019

(54) SPEECH RECOGNITION METHOD, DEVICE AND SYSTEM BASED ON ARTIFICIAL INTELLIGENCE

(71) Applicant: BAIDU ONLINE NETWORK TECHNOLOGY (BEIJING) CO., LTD., Beijing (CN)

(72) Inventors: Niandong Du, Beijing (CN); Yan Xie, Beijing (CN); Haiyuan Tang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/854,904

(22) Filed: Dec. 27, 2017

(65) Prior Publication Data

US 2018/0293987 A1 Oct. 11, 2018

(30) Foreign Application Priority Data

Apr. 7, 2017 (CN) .......................... 2017 1 0223526

(51) Int. Cl.
| | |
|---|---|
| *G10L 15/00* | (2013.01) |
| *G10L 21/00* | (2013.01) |
| *G10L 25/00* | (2013.01) |
| *G10L 15/30* | (2013.01) |
| *H04L 29/06* | (2006.01) |
| *H04L 29/08* | (2006.01) |
| *G10L 15/22* | (2006.01) |

(52) U.S. Cl.
CPC .............. *G10L 15/30* (2013.01); *G10L 15/22* (2013.01); *H04L 67/10* (2013.01); *H04L 67/141* (2013.01); *H04L 67/146* (2013.01); *H04L 67/42* (2013.01)

(58) Field of Classification Search
CPC ......... G06N 99/00; G10L 15/22; G10L 15/30; H04L 63/0861; H04L 67/10; H04L 67/141; H04L 67/146; H04L 67/42
USPC .............................. 704/200, 231, 232, 270.1
See application file for complete search history.

(56) References Cited

U.S. PATENT DOCUMENTS

| | | | | |
|---|---|---|---|---|
| 6,801,604 B2* | 10/2004 | Maes | ...................... | G10L 15/30 379/88.16 |
| 6,934,756 B2* | 8/2005 | Maes | ...................... | G10L 15/30 370/352 |
| 7,047,196 B2* | 5/2006 | Calderone | ............ | G06Q 20/102 704/270.1 |
| 7,529,675 B2* | 5/2009 | Maes | ...................... | G10L 15/30 704/270.1 |
| 7,685,523 B2* | 3/2010 | Calderone | ............ | G06Q 20/102 704/201 |

(Continued)

*Primary Examiner* — Khai N. Nguyen
(74) *Attorney, Agent, or Firm* — Hodgson Russ LLP

(57) ABSTRACT

The present disclosure provides a speech recognition method, device and system based on artificial intelligence. The method includes: collecting speech data to be recognized in a speech recognition process; sending uplink data stream to a server via an uplink connection to the server, in which the uplink data stream includes the speech data; and receiving downlink data stream sent by the server via a downlink connection to the server in parallel with sending the uplink data stream to the server, in which the downlink data stream includes result data, and the result data is obtained by the server performing speech recognition according to the speech data.

12 Claims, 4 Drawing Sheets

(56) References Cited

U.S. PATENT DOCUMENTS

| | | | | |
|---|---|---|---|---|
| RE44,326 E | * | 6/2013 | Calderone | G06Q 20/102 |
| | | | | 704/201 |
| 2002/0184373 A1 | * | 12/2002 | Maes | G10L 15/30 |
| | | | | 709/228 |
| 2003/0088421 A1 | * | 5/2003 | Maes | G10L 15/30 |
| | | | | 704/270.1 |
| 2006/0041431 A1 | * | 2/2006 | Maes | G10L 15/30 |
| | | | | 704/270.1 |
| 2009/0168715 A1 | * | 7/2009 | Cai | H04W 72/02 |
| | | | | 370/329 |
| 2009/0171659 A1 | * | 7/2009 | Pearce | G10L 15/24 |
| | | | | 704/235 |
| 2009/0171669 A1 | * | 7/2009 | Engelsma | G10L 15/22 |
| | | | | 704/275 |
| 2014/0278436 A1 | * | 9/2014 | Khanna | G10L 21/00 |
| | | | | 704/275 |
| 2016/0351190 A1 | * | 12/2016 | Piernot | G10L 15/22 |
| 2017/0352346 A1 | * | 12/2017 | Paulik | G10L 15/063 |
| 2017/0358301 A1 | * | 12/2017 | Raitio | G10L 13/033 |
| 2018/0293987 A1 | * | 10/2018 | Du | G10L 15/30 |

\* cited by examiner

SPEECH RECOGNITION METHOD, DEVICE AND SYSTEM BASED ON ARTIFICIAL INTELLIGENCE

This application is based on and claims priority to Chinese Patent Application No. 201710223526.X, filed on Apr. 7, 2017, the entire contents of which are incorporated herein by reference.

FIELD

The present disclosure relates to a speech recognition technology field, and more particularly to a speech recognition method based on artificial intelligence, a speech recognition device based on artificial intelligence and a speech recognition system based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce a new intelligent machine capable of acting in a same way as human intelligence. The researches in this field include robots, speech recognition, image recognition, natural language processing and expert systems, etc., in which one of most important aspects of AI is the speech recognition technology.

At present, in the speech recognition, speech data is sent to a speech server mainly via a plurality of Http connections, the speech server reintegrates the received speech data and then performs speech recognition.

However, the inventor finds that there are at least following problems in the related art. During performing the speech recognition via the plurality of Http connections, the speech server needs to reorder and integrate the speech data, and thus real-time upload and down sending of data cannot be realized. Moreover, each connection may additionally consume structure such as Http head, and thus the consumed traffic flow is large.

SUMMARY

Embodiments of the present disclosure seek to solve at least one of the problems existing in the related art to at least some extent.

Embodiments of a first aspect of the present disclosure provide a speech recognition method based on artificial intelligence, including: collecting speech data to be recognized in a speech recognition process; sending uplink data stream to a server via an uplink connection to the server, in which the uplink data stream includes the speech data; and receiving downlink data stream sent by the server via a downlink connection to the server in parallel with sending the uplink data stream to the server, in which the downlink data stream includes result data, and the result data is obtained by the server performing speech recognition according to the speech data.

With the speech recognition method based on artificial intelligence according to embodiments of the present disclosure, by sending the uplink data stream containing the speech data to be recognized to the server via the uplink connection to the server, and by receiving the downlink data stream containing a result of the speech recognition in parallel via the downlink connection to the server, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

Embodiments of a second aspect of the present disclosure provide a speech recognition method based on artificial intelligence, including: receiving uplink data stream sent by a client via an uplink connection to the client; performing speech recognition on speech data in the uplink data stream to obtain result data; and sending downlink data stream to the client via a downlink connection to the client in parallel with receiving the uplink data stream sent by the client, in which the downlink data stream includes the result data.

With the speech recognition method based on artificial intelligence according to embodiments of the present disclosure, by receiving the uplink data stream containing the speech data to be recognized via the uplink connection to the client, performing the speech recognition on the speech data to be recognized, and sending the downlink data stream containing a result of the speech recognition to the client in parallel via the downlink connection to the client, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

Embodiments of a third aspect of the present disclosure provide a speech recognition device based on artificial intelligence, including: a collecting module, configured to collect speech data to be recognized in a speech recognition process; a sending module, configured to send uplink data stream to a server via an uplink connection to the server, in which the uplink data stream includes the speech data; and a receiving module, configured to receive downlink data stream sent by the server via a downlink connection to the server in parallel with sending the uplink data stream to the server, in which the downlink data stream includes result data, and the result data is obtained by the server performing speech recognition according to the speech data.

With the speech recognition device based on artificial intelligence according to embodiments of the present disclosure, by sending the uplink data stream containing the speech data to be recognized to the server via the uplink connection to the server, and receiving the downlink data stream containing a result of the speech recognition in parallel via the downlink connection to the server, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

Embodiments of a fourth aspect of the present disclosure provide a speech recognition device based on artificial intelligence, including: a receiving module, configured to receive uplink data stream sent by a client via an uplink connection to the client; a processing module, configured to perform speech recognition on speech data in the uplink data stream to obtain result data; and a sending module, configured to send downlink data stream to the client via a downlink connection to the client in parallel with receiving the uplink data stream sent by the client, in which the downlink data stream includes the result data.

With the speech recognition device based on artificial intelligence according to embodiments of the present disclosure, by receiving the uplink data stream containing the speech data to be recognized sent by the client via the uplink connection to the client, performing the speech recognition on the speech data to be recognized, and sending the downlink data stream containing a result of the speech recognition to the client in parallel via the downlink connection to the client, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

Embodiments of a fifth aspect of the present disclosure provide a client, including a processor and a memory configured to store instructions executable by the processor. The processor is configured to: collect speech data to be recognized in a speech recognition process; send uplink data stream to a server via an uplink connection to the server, in which the uplink data stream includes the speech data; and receive downlink data stream sent by the server via a downlink connection to the server in parallel with sending the uplink data stream to the server, in which the downlink data stream includes result data, and the result data is obtained by the server performing speech recognition according to the speech data.

Embodiments of a sixth aspect of the present disclosure provide a server, including a processor and a memory configured to store instructions executable by the processor. The processor is configured to: receive uplink data stream sent by a client via an uplink connection to the client; perform speech recognition on speech data in the uplink data stream to obtain result data; and send downlink data stream to the client via a downlink connection to the client in parallel with receiving the uplink data stream sent by the client, in which the downlink data stream includes the result data.

Embodiments of a seventh aspect of the present disclosure provide a speech recognition system based on artificial intelligence, including the client according to embodiments of the fifth aspect of the present disclosure and the server according to embodiments of the sixth aspect of the present disclosure. The client and the server communicate with each other via the uplink connection and the downlink connection.

Embodiments of an eighth aspect of the present disclosure provide a non-transitory computer readable storage medium. When instructions in the storage medium are executed by a processor of a client, the client is caused to perform a speech recognition method based on artificial intelligence. The method includes: collecting speech data to be recognized in a speech recognition process; sending uplink data stream to a server via an uplink connection to the server, in which the uplink data stream includes the speech data; and receiving downlink data stream sent by the server via a downlink connection to the server in parallel with sending the uplink data stream to the server, in which the downlink data stream includes result data, and the result data is obtained by the server performing speech recognition according to the speech data.

Embodiments of a ninth aspect of the present disclosure provide a non-transitory computer readable storage medium. When instructions in the storage medium are executed by a processor of a server, the server is caused to perform a speech recognition method based on artificial intelligence. The method includes: receiving uplink data stream sent by a client via an uplink connection to the client; performing speech recognition on speech data in the uplink data stream to obtain result data; and sending downlink data stream to the client via a downlink connection to the client in parallel with receiving the uplink data stream sent by the client, in which the downlink data stream includes the result data.

Embodiments of a tenth aspect of the present disclosure provide a computer program product. When instructions in the computer program product are executed by a processor, a speech recognition method based on artificial intelligence is performed. The method includes: collecting speech data to be recognized in a speech recognition process; sending uplink data stream to a server via an uplink connection to the server, in which the uplink data stream includes the speech data; and receiving downlink data stream sent by the server via a downlink connection to the server in parallel with sending the uplink data stream to the server, in which the downlink data stream includes result data, and the result data is obtained by the server performing speech recognition according to the speech data.

Embodiments of a tenth aspect of the present disclosure provide a computer program product. When instructions in the computer program product are executed by a processor, a speech recognition method based on artificial intelligence is performed. The method includes: receiving uplink data stream sent by a client via an uplink connection to the client; performing speech recognition on speech data in the uplink data stream to obtain result data; and sending downlink data stream to the client via a downlink connection to the client in parallel with receiving the uplink data stream sent by the client, in which the downlink data stream includes the result data. Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
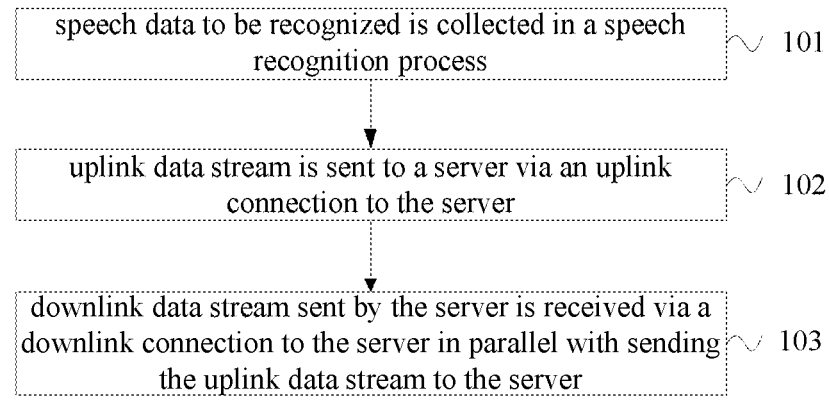
FIG. 1 is a flow chart of a speech recognition method based on artificial intelligence according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A speech recognition method, device and system based on artificial intelligence will be described below with reference to drawings.

FIG. 1 is a flow chart of a speech recognition method based on artificial intelligence according to an embodiment of the present disclosure.

With the maturity and development of the speech recognition technology, requirements of people to the speech recognition get higher and higher. For example, a speech recognition method is required, which allows a server to receive speech data of a user in real time and to send recognition result in real time when the user is speaking.

At present, in the speech recognition, speech data is sent to a speech server mainly via a plurality of Http connections, the speech server reintegrates the speech data and then performs speech recognition. However, in the existing speech recognition method, the server needs to reintegrates the speech data before the speech recognition, and thus it cannot realize real-time upload of the speech data and real-time down sending of the speech recognition result.

For this, embodiments of the present disclosure provide a speech recognition method based on artificial intelligence, so as to realize real-time upload of speech data to be recognized and real-time down sending of the speech recognition result. As illustrated in FIG. 1, the speech recognition method based on artificial intelligence includes followings.

At block 101, speech data to be recognized is collected in a speech recognition process.

In an embodiment of the present disclosure, in the speech recognition process, the speech data to be recognized may be collected by a mobile terminal having a speech recognition function, such as a mobile phone, a tablet computer, and the like. For example, if a user wants to search for hot movies in 2017 through a browser in the mobile phone, the user may open a browser AA in the mobile phone, and press on a speech button to input a piece of voice "hot movies in 2017", such that the mobile phone may collect the speech data to be recognized.

At block 102, uplink data stream is sent to a server via an uplink connection to the server.

The uplink data stream includes the speech data.

In an embodiment of the present disclosure, after the mobile terminal collects the speech data to be recognized, the mobile terminal may send two Http connection requests to the server at the same time, such that two connections are established between the mobile terminal and the server, i.e., the uplink connection and the downlink connection respectively. The mobile terminal sends the uplink data stream to the server via the uplink connection, and receives downlink data stream sent by the server via the downlink connection.

To distinguish the two connections in a same speech recognition process, identifiers "up" and "down" in uniform resource locators (URL for short) of the connections may be used. A connection whose URL containing "up" is the uplink connection. A connection whose URL containing "down" is the downlink connection.

To ensure two Http connection requests belong to one speech recognition process, both the URL of the uplink connection and the URL of the downlink connection may be configured to contain a same session identification of the speech recognition process. Session identifications have a one-to-one correspondence with speech recognition processes, such that the server may determine a correspondence relationship between the uplink connection and the downlink connection according to the session identification.

Figure 2:
FIG. 2 is a schematic diagram illustrating an effect of two Http connections established between a mobile terminal and a server in a speech recognition process according to an embodiment of the present disclosure.

As illustrated in FIG. 2, in a speech recognition process, two Http connections are established between the mobile terminal and the server. The session identifications (i.e. "sn") of the two connections are identical, values of which are both 123. By comparing the URLs of the two connections, it can be known that, "Http://speech.baidu.com/up? sn=123" contains "up", and thus this URL is of the uplink connection, and "Http://speech.baidu.com/down? sn=123" contains "down", and thus this URL is of the downlink connection.

In an embodiment of the present disclosure, the uplink connection and the downlink connection are based on a Http protocol, and can realize streaming upload of data and streaming down sending of recognition result through Http chunked protocol, thus realizing full-duplex communication between the mobile terminal and the server.

Figure 3:
FIG. 3 is a schematic diagram illustrating a structure of data content according to an embodiment of the present disclosure.

In addition, the protocol indicates a structure of data content in the uplink data stream and in the downlink data stream. The structure of data content includes a data type, a data length and a value. The data structure is illustrated as FIG. 3, in which, "Type" represents the data type, "Length" represents current data length, and "Value" represents the data content. The data type is configured to indicate a data processing mode of the data content.

In embodiments of the present disclosure, the data type may be various, and therefore, data extension may be easily performed on the structure of data content indicated by the Http protocol. In addition, compared with the solution transmitting data through a plurality of Http connections in the related art, the solution with the structure of data content and transmitting data through two Http connections may reduce traffic flow, and save network consumption in the process of speech recognition.

After the Http connection between the mobile terminal and the server is established, the speech data may be packaged according to the above-mentioned structure of data content, and then the uplink data stream containing the speech data is sent to the server via the uplink connection to the server.

It should be noted that, in the speech recognition process, data sent to the server by the mobile terminal may include parameter data (such as identification, model and the like of the mobile terminal) and application data (such as third party application data) in addition to the speech data. Therefore, before the uplink data stream is sent to the server, a packaging may be performed according to the data types corresponding to the speech data, the parameter data and the application data to obtain first data content satisfying the Http protocol. Then, the first data content is added to the uplink data stream and sent to the server.

At block 103, downlink data stream sent by the server is received via the downlink connection to the server in parallel with sending the uplink data stream to the server.

The downlink data stream includes result data. The result data is obtained by the server performing speech recognition according to the speech data.

In an embodiment of the present disclosure, in a process that the mobile terminal sends the uplink data stream containing the speech data to the server, the mobile terminal receives the downlink data stream containing the result of the speech recognition sent by the server in parallel via the downlink connection with the server.

After the mobile terminal receives second data content in the downlink data stream, the mobile terminal acquires the data type of the second data content, and the mobile terminal performs data processing on the second data content with a data processing mode indicated by the data type. For example, if the data processing mode indicated by the data type of certain data content is acquired as performing speech recognition to obtain result data, the result data may be displayed to the user.

With the speech recognition method based on artificial intelligence according to embodiments of the present disclosure, by sending the uplink data stream containing the speech data to be recognized to the server via the uplink connection to the server, and receiving the downlink data stream containing a result of the speech recognition in parallel via the downlink connection to the server, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

The above embodiment is an artificial intelligence-based speech recognition method described from the client side. To clearly describe the foregoing embodiment, a speech recognition method based on artificial intelligence is described below from a server side with reference to FIG. 4.

Figure 4:
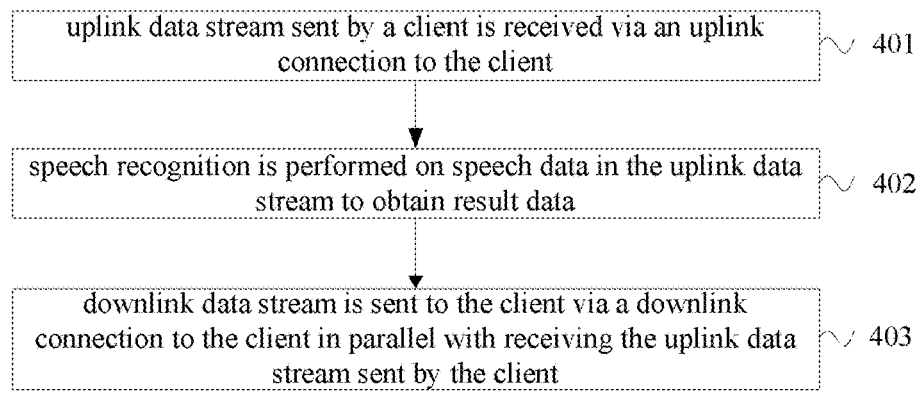
FIG. 4 is a flow chart of a speech recognition method based on artificial intelligence according to another embodiment of the present disclosure.

As illustrated in FIG. 4, the speech recognition method based on artificial intelligence includes followings.

At block 401, uplink data stream sent by a client is received via an uplink connection to the client.

In an embodiment of the present disclosure, when a user uses speech recognition function of a client, a server establishes two connections, i.e. the uplink connection and a downlink connection, with the client according to a request for establishing two Http connections sent by the client. Regarding explanation and description about the uplink connection and the downlink connection, reference may be made to above-mentioned embodiments, which are not elaborated here.

In a speech recognition process, the server may receive the uplink data stream sent by the client via the uplink connection to the client. First data content in the uplink data stream includes speech data to be recognized. The first data content may further include parameter data, application data and the like in addition to the speech data.

At block 402, speech recognition is performed on speech data in the uplink data stream to obtain result data.

In an embodiment of the present disclosure, after the server receives the first data content sent by the client, the server acquires a data type in a structure of the first data content. The server performs speech recognition on data whose acquired data type indicates that a data processing mode is speech recognition, to obtain result data of speech recognition.

In an embodiment of the present disclosure, when the data processing mode indicated by the acquired data type is not the speech recognition, for example, for parameter data, or third party application data, and the like, the server performs corresponding data processing on the first data content. For example, for the parameter data including client identification in the first data content, the server may determine an identification of the client sending the speech data to be recognized. For the third party application data, the server may obtain related resource data from the third party according to the speech recognition result and the third party application data. For example, the user input a piece of speech "what is the weather today" on the client, the server recognizes that the user wants to inquire weather condition of today according to the speech data, and then the server may obtain the weather condition of today from a third party weather report platform according to the speech recognition result and the third party application data in the first data content.

At block 403, downlink data stream is sent to the client via the downlink connection to the client in parallel with =receiving the uplink data stream sent by the client.

The downlink data stream includes the result data.

In an embodiment of the present disclosure, the session identifications have a one-to-one correspondence with speech recognition processes, and therefore, in the process of receiving the uplink data stream sent by the client via the uplink connection, the server may acquire the downlink connection whose URL contains the same session identification according to the session identification contained in the URL of the uplink connection, and the server sends the downlink data stream to the client in parallel via the acquired downlink connection. In detail, the server may acquire corresponding data types of parameter data, result data and application data obtained by the data processing, and perform packaging according to the acquired data types to obtain second data content satisfying the Http protocol, and then add the second data content to the downlink data stream to be sent to the client via the downlink connection.

Further, when the second data content contains the third party application data, in a condition that the third party resource data is very large, the client may communicate with the third party service side according to the third party application data, in which the two sides (the client and the third party service) use the above-mentioned streaming transport protocol. The third party service side transmits the resource data to the client via the streaming transport protocol, such that the client may receive the resource data more quickly. In a condition that the resource data is larger, the client may perform related pre-processing or loading operations when part of data is received, thus reducing user's waiting time.

It can be seen that, the streaming transport protocol provided in embodiments of the present disclosure may better dock with the third party resource in complicated speech recognition scenario.

With the speech recognition method based on artificial intelligence according to embodiments of the present disclosure, by receiving the uplink data stream containing the speech data to be recognized via the uplink connection to the client, performing the speech recognition on the speech data to be recognized, and sending the downlink data stream containing a result of the speech recognition to the client in parallel via the downlink connection to the client, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

To realize above-mentioned embodiments, the present disclosure further provides a speech recognition device based on artificial intelligence.

Figure 5:
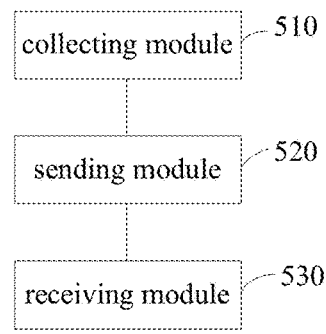
FIG. 5 is a block diagram of a speech recognition device based on artificial intelligence according to an embodiment of the present disclosure.

FIG. 5 is a block diagram of a speech recognition device based on artificial intelligence according to an embodiment of the present disclosure.

At illustrated in FIG. 5, the speech recognition device based on artificial intelligence includes a collecting module 510, a sending module 520 and a receiving module 530.

The collecting module 510 is configured to collect speech data to be recognized in a speech recognition process.

The sending module 520 is configured to send uplink data stream to a server via an uplink connection to the server. The uplink data stream includes the speech data.

The receiving module 530 is configured to receive downlink data stream sent by the server via a downlink connection to the server in parallel with sending the uplink data stream to the server. The downlink data stream includes result data. The result data is obtained by the server performing speech recognition according to the speech data.

Figure 6:
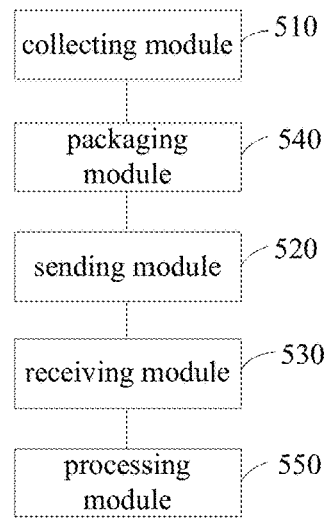
FIG. 6 is a block diagram of a speech recognition device based on artificial intelligence according to another embodiment of the present disclosure.

Based on above-mentioned embodiments, embodiments of the present disclosure further provide a possible implementation of the speech recognition device based on artificial intelligence. As illustrated in FIG. 6, the speech recognition device based on artificial intelligence may further include a packaging module 540 and a processing module 550.

The packaging module 540 is configured to perform packaging according to data types corresponding to the speech data, parameter data and/or application data to obtain first data content satisfying the protocol, and to add the first data content to the uplink data stream.

The processing module 550 is configured to acquire a data type of second data content in the downlink data stream, and to perform data processing on the second data content with a data processing mode indicated by the data type of the second data content.

In an embodiment of the present disclosure, both a URL of the uplink connection and a URL of the downlink connection include a session identification of the speech recognition process, such that the server determines a correspondence relationship between the uplink connection and the downlink connection according to the session identification. The uplink connection and the downlink connection are based on Http protocol. The protocol indicates a structure of data content in the uplink data stream and in the downlink data stream, and the structure of data content includes a data type, a data length and/or value. The data type is configured to indicate a data processing mode of the data content.

It should be noted that, explanations and descriptions in the foregoing embodiments of the speech recognition method based on artificial intelligence are suitable for the embodiments of the speech recognition device based on artificial intelligence, which are not elaborated here.

With the speech recognition device based on artificial intelligence according to embodiments of the present disclosure, by sending the uplink data stream containing the speech data to be recognized to the server via the uplink connection to the server, and receiving the downlink data stream containing a result of the speech recognition in parallel via the downlink connection to the server, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

To achieve above objectives, the present disclosure further provides another speech recognition device based on artificial intelligence.

Figure 7:
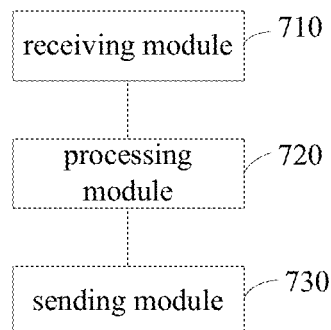
FIG. 7 is a block diagram of a speech recognition device based on artificial intelligence according to yet another embodiment of the present disclosure.

As illustrated in FIG. 7, the speech recognition device based on artificial intelligence includes a receiving module 710, a processing module 720, and a sending module 730.

The receiving module 710 is configured to receive uplink data stream sent by a client via an uplink connection to the client.

The processing module 720 is configured to perform speech recognition on speech data in the uplink data stream to obtain result data.

The processing module 720 is further configured to acquire a data type of first data content in the uplink data stream, and to acquire a data processing mode indicated by the data type of the first data content as speech recognition.

The sending module 730 is configured to send downlink data stream to the client via a downlink connection to the client in parallel with receiving the uplink data stream sent by the client, in which the downlink data stream includes the result data.

Figure 8:
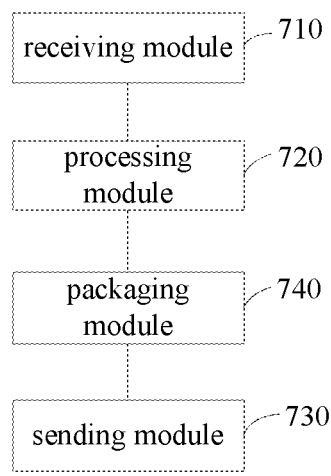
FIG. 8 is a block diagram of a speech recognition device based on artificial intelligence according to still yet another embodiment of the present disclosure.

Based on above-mentioned embodiments, embodiments of the present disclosure further provide a possible implementation of the speech recognition device based on artificial intelligence. Based on the above embodiment, as illustrated in FIG. 8, the device further includes a packaging module 740.

The packaging module 740 is configured to perform data processing on the first data content with the data processing mode indicated by the data type of the first data content when the data processing mode indicated by the data type of the first data content is not the speech recognition, to acquire corresponding data types according to parameter data, result data and/or application data obtained by the data processing, to perform packaging according to the acquired data types to obtain second data content satisfying the protocol, and to add the second data content to the downlink data stream.

It should be noted that, explanations and descriptions in the foregoing embodiments of the speech recognition method based on artificial intelligence are suitable for the embodiments of the speech recognition device based on artificial intelligence, which are not elaborated here.

With the speech recognition device based on artificial intelligence according to embodiments of the present disclosure, by receiving the uplink data stream containing the speech data to be recognized via the uplink connection to the client, performing the speech recognition on the speech data to be recognized, and sending the downlink data stream containing a result of the speech recognition to the client in parallel via the downlink connection to the client, the real-time upload of the speech data to be recognized and the real-time down sending of the result of speech recognition are realized in a streaming data transmission mode via the two data streams in parallel, thus solving the technical problem in the related art that the real-time upload and down sending of data cannot be realized.

To realize above-mentioned embodiments, the present disclosure further provides a client. The client includes a processor and a memory configured to store instructions executable by the processor.

The processor is configured to: collect speech data to be recognized in a speech recognition process; send uplink data stream to a server via an uplink connection to the server, in which the uplink data stream includes the speech data; and receive downlink data stream sent by the server via a downlink connection to the server in parallel with sending the uplink data stream to the server, in which the downlink data stream includes result data, and the result data is obtained by the server performing speech recognition according to the speech data.

To realize above-mentioned embodiments, the present disclosure further provides a server. The server includes a processor and a memory configured to store instructions executable by the processor.

The processor is configured to: receive uplink data stream sent by a client via an uplink connection to the client; perform speech recognition on speech data in the uplink data stream to obtain result data; and send downlink data stream to the client via a downlink connection to the client in parallel with receiving the uplink data stream sent by the client, in which the downlink data stream includes the result data.

Figure 9:
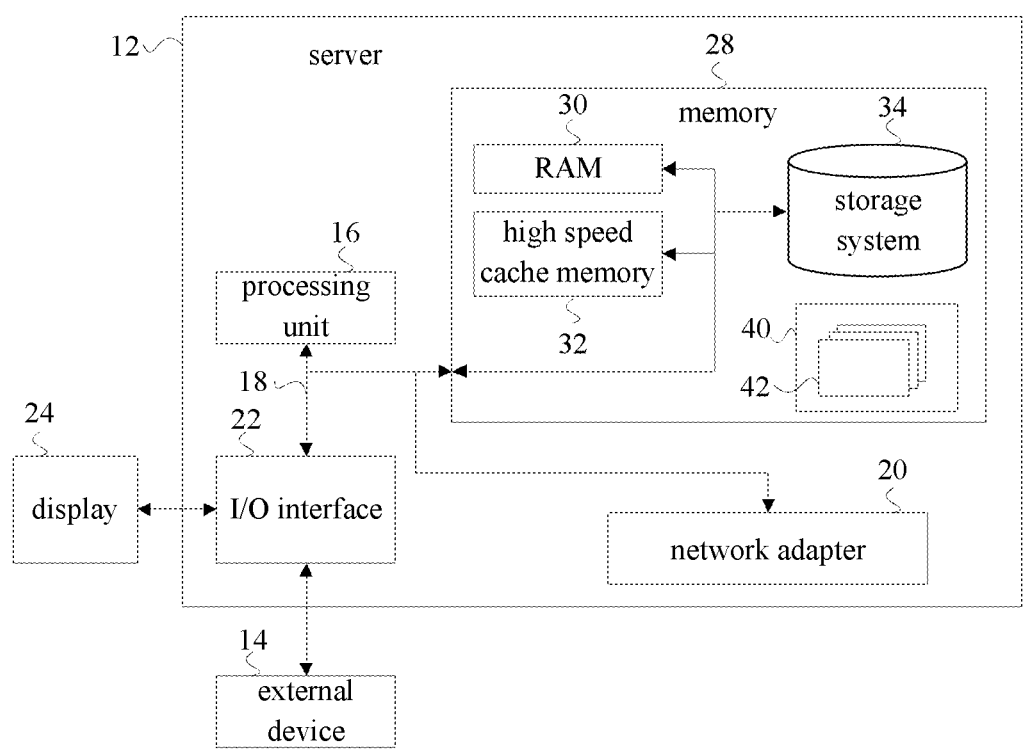
FIG. 9 is a block diagram of a server according to an embodiment of the present disclosure.

To clearly illustrate a detail structure of the foregoing server, FIG. 9 illustrates a block diagram of an exemplary server 12 suitable for realizing implementations of the present disclosure. The server 12 illustrated in FIG. 9 is merely an example, which should not be understood to bring any limitation to functions and application scope of embodiments of the present disclosure.

As illustrated in FIG. 9, the server 12 is represented in a form of a general computer device. Components of the server 12 may include but may not be limited to one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and a Peripheral Component Interconnection (PCI) bus.

The server 12 typically includes a variety of computer system readable media. These media may be any available media accessible by the server 12 and include both volatile and non-volatile media, removable and non-removable media.

The system memory 28 may include a computer system readable medium in the form of volatile memory, such as a random access memory (hereinafter referred to as RAM) 30 and/or a high speed cache memory 32. The server 12 may further include other removable or non-removable, volatile or non-volatile computer system storage media. By way of example only, the storage system 34 may be configured to read from and write to a non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The server 12 may also communicate with one or more external devices 14 (such as, a keyboard, a pointing device, a display 24, etc.). Furthermore, the server 12 may also communicate with one or more communication devices enabling a user to interact with the server 12 and/or other devices (such as a network card, modem, etc.) enabling the server 12 to communicate with one or more other computer devices. This communication can be performed via the input/output (I/O) interface 22. Also, the server 12 may communicate with one or more networks (such as a local area network, a wide area network and/or a public network such as an Internet) through a network adapter 20. As illustrated, the network adapter 20 communicates with other modules of the server 12 via the bus 18. It should be understood that, although not shown, other hardware and/or software modules may be used in connection with the server 12. The hardware and/or software includes, but is not limited to, microcode, device drivers, redundant processing units, external disk drive arrays, RAID systems, tape drives and data backup storage systems.

The processing unit 16 is configured to execute various functional applications and data processing by running programs stored in the system memory 28, thus implementing the above mentioned speech recognition method based on artificial intelligence.

To achieve above objectives, the present disclosure further provides a speech recognition system based on artificial intelligence, which includes the client and the server according to above-mentioned embodiments of the present disclosure. The client and the server communicate with each other via the uplink connection and the downlink connection.

To achieve above embodiments, the present disclosure further provides a non-transitory computer readable medium. When instructions in the storage medium are executed by a processor of a client, the client is caused to perform a speech recognition method based on artificial intelligence. The method includes: collecting speech data to be recognized in a speech recognition process; sending uplink data stream to a server via an uplink connection to the server, in which the uplink data stream includes the speech data; and receiving downlink data stream sent by the server via a downlink connection to the server in parallel with sending the uplink data stream to the server, in which the downlink data stream includes result data, and the result data is obtained by the server performing speech recognition according to the speech data.

To achieve above embodiments, the present disclosure further provides a non-transitory computer readable medium. When instructions in the storage medium are executed by a processor of a server, the server is caused to perform a speech recognition method based on artificial intelligence. The method includes: receiving uplink data stream sent by a client via an uplink connection to the client; performing speech recognition on speech data in the uplink data stream to obtain result data; and sending downlink data stream to the client via a downlink connection to the client in parallel with receiving the uplink data stream sent by the client, in which the downlink data stream includes the result data.

To achieve above embodiments, the present disclosure further provides a computer program product. When instructions in the computer program product are executed by a processor, a speech recognition method based on artificial intelligence is performed. The method includes: collecting speech data to be recognized in a speech recognition process; sending uplink data stream to a server via an uplink connection to the server, in which the uplink data stream includes the speech data; and receiving downlink data stream sent by the server via a downlink connection to the server in parallel with sending the uplink data stream to the server, in which the downlink data stream includes result data, and the result data is obtained by the server performing speech recognition according to the speech data.

To achieve above embodiments, the present disclosure further provides a computer program product. When instructions in the computer program product are executed by a processor, a speech recognition method based on artificial intelligence is performed. The method includes: receiving uplink data stream sent by a client via an uplink connection to the client; performing speech recognition on speech data in the uplink data stream to obtain result data; and sending downlink data stream to the client via a downlink connection to the client in parallel with receiving the uplink data stream sent by the client, in which the downlink data stream includes the result data.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, such as two or three, unless specified otherwise.

Any process or method described herein in the flow chart or in other manners may be understood to represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A speech recognition method based on artificial intelligence, comprising:
   collecting speech data to be recognized in a speech recognition process at a client device;
   sending uplink data stream from the client device to a server via an uplink connection to the server, wherein the uplink data stream comprises the speech data; and
   receiving, at the client device, downlink data stream sent by the server via a downlink connection to the server in parallel with sending, from the client device, the uplink data stream to the server, wherein the downlink data stream comprises result data, and the result data is obtained by the server performing speech recognition according to the speech data;
   wherein each of a uniform resource locator (URL) of the uplink connection and a URL of the downlink connection comprises a session identification of the speech recognition process, such that the server determines a correspondence relationship between the uplink connection and the downlink connection according to the session identifications, the URL of the uplink connection being distinct from the URL of the downlink connection.

2. The method according to claim 1, wherein the uplink connection and the downlink connection are based on a protocol, the protocol indicates a structure of data content in the uplink data stream and in the downlink data stream, and the structure of data content comprises a data type, a data length and/or value, the protocol being HyperText Transfer Protocol (HTTP);
   wherein the data type is configured to indicate a data processing mode of the data content.

3. The method according to claim 2, before sending the uplink data stream to the server via the uplink connection to the server, further comprising:
   performing packaging according to data types corresponding to the speech data, parameter data and/or application data to obtain first data content satisfying the protocol; and
   adding the first data content to the uplink data stream.

4. The method according to claim 2, after receiving the downlink data stream sent by the server via the downlink connection to the server, further comprising:
   acquiring the data type of second data content in the downlink data stream; and
   performing data processing on the second data content with a data processing mode indicated by the data type of the second data content.

5. A speech recognition method based on artificial intelligence, comprising:
   receiving, at a server, an uplink data stream sent by a client via an uplink connection to the client;
   performing, by the server, speech recognition on speech data in the uplink data stream to obtain result data; and
   sending, from the server, downlink data stream to the client via a downlink connection to the client in parallel with receiving uplink data stream sent by the client, wherein the downlink data stream comprises the result data;
   wherein sending downlink data stream to the client via the downlink connection to the client comprises:
      acquiring the downlink connection with a URL containing a session identification same as a session identification contained in a URL of the uplink connection, wherein the session identifications are corresponding to speech recognition processes one by one, the URL of the uplink connection being distinct from the URL of the downlink connection; and
      sending the downlink data stream to the client via the acquired downlink connection.

6. The method according to claim 5, wherein the uplink connection and the downlink connection are based on a protocol, the protocol indicates a structure of data content in the uplink data stream and in the downlink data stream, and the structure of data content comprises a data type, a data length and/or value, the protocol being HyperText Transfer Protocol (HTTP);
   wherein the data type is configured to indicate a data processing mode of the data content.

7. The method according to claim 6, before performing speech recognition on speech data in the uplink data stream to obtain result data, further comprising:
   acquiring the data type of first data content in the uplink data stream; and
   acquiring a data processing mode indicated by the data type of the first data content as speech recognition.

8. The method according to claim 7, wherein after acquiring the data type, further comprising:
   when the data processing mode indicated by the data type of the first data content is not the speech recognition, performing data processing on the first data content with the data processing mode indicated by the data type of the first data content; and
   acquiring corresponding data types according to parameter data, result data and/or application data obtained by the data processing, and performing packaging according to the acquired data types to obtain second data content satisfying the protocol; and
   adding the second data content to the downlink data stream.

9. A speech recognition device based on artificial intelligence, comprising:
   a processor; and
   a memory, configured to store one or more software modules executable by the processor,
   wherein the one or more software modules comprise:
      a collecting module, configured to collect speech data to be recognized in a speech recognition process at a client device;
      a sending module, configured to send uplink data stream from the client device to a server via an uplink connection to the server, wherein the uplink data stream comprises the speech data; and
      a receiving module, configured to receive, at the client device, downlink data stream sent by the server a downlink connection to the server in parallel with sending, from the client device, the uplink data stream to the server, wherein the downlink data stream comprises result data, and the result data is obtained by the server performing speech recognition according to the speech data;
   wherein each of a URL of the uplink connection and a URL of the downlink connection comprises a session identification of the speech recognition process, such that the server determines a correspondence relationship between the uplink connection and the downlink connection according to the session identifications, the URL of the uplink connection being distinct from the URL of the downlink connection.

10. The device according to claim 9, wherein the uplink connection and the downlink connection are based on a protocol, the protocol indicates a structure of data content in the uplink data stream and in the downlink data stream, and the structure of data content comprises a data type, a data length and/or value, the protocol being HyperText Transfer Protocol (HTTP);

wherein the data type is configured to indicate a data processing mode of the data content.

11. The device according to claim 10, wherein the one or more software modules further comprise:

a packaging module, configured to perform packaging according to data types corresponding to the speech data, parameter data and/or application data to obtain first data content satisfying the protocol, and to add the first data content to the uplink data stream.

12. The device according to claim 10, wherein the one or more software modules further comprise:

a processing module, configured to acquire a data type of second data content in the downlink data stream, and to perform data processing on the second data content with a data processing mode indicated by the data type of the second data content.

\* \* \* \* \*